July 21, 1942. C. M. SMITH, JR 2,290,214
PROCESS OF PRODUCING ICE CREAM
Filed July 26, 1939
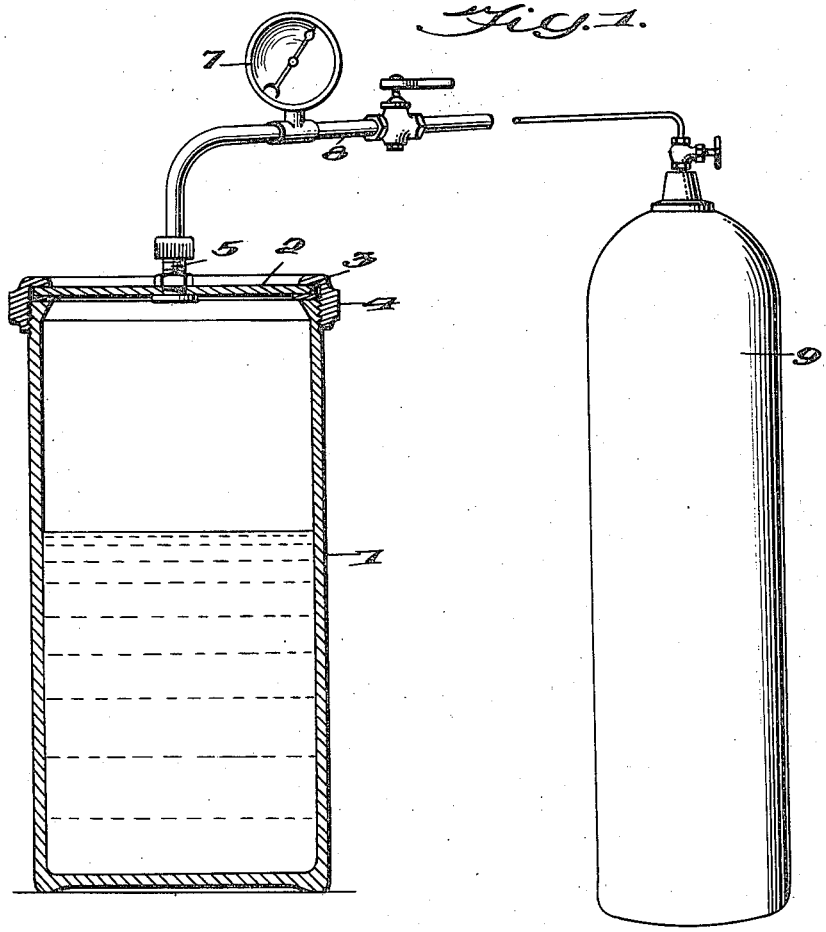
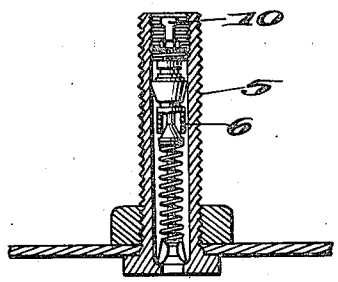
Inventor
Clarence M. Smith, Jr.
By N. S. McDowell
Attorney Patented July 21, 1942

2,290,214

UNITED STATES PATENT OFFICE 2,290,214

PROCESS OF PRODUCING ICE CREAM

Clarence M. Smith, Jr., Columbus, Ohio, assignor to Aeration Processes, Inc., Columbus, Ohio, a corporation of Ohio Application July 26, 1939, Serial No. 286,720

5 Claims. (Cl. 62—174)

This invention relates to ice cream and ice cream manufacture, and is herein disclosed in some detail as embodied in the production of ice cream in commercial quantities, although the procedure is well adapted for making ice cream in homes or small business establishments having suitable refrigerating equipment.

Commercial ice cream often is manufactured by homogenizing the cream mix, and then beating the mix in order to whip air into the same so that upon solidification it will possess a desired volume. Usually the mixture is transferred into molds which are moved into a cold room or other refrigerated space where the freezing operation is carried out. In commercial manufacture of ice cream, these operations involve the employment of elaborate and costly equipment and the services of skilled supervisors.

It is an object of the present invention to simplify the manufacture of ice cream, to render the operation less costly and more certain, and to eliminate the need for employing the costly machinery hitherto employed in carrying out the operation on a large scale commercial basis. It is another object of the invention to produce ice cream which is characterized by its uniform, smooth quality throughout the entire body thereof and wherein the operation of producing the ice cream is one which may be easily controlled and duplicated.

In the form of the invention here disclosed the liquid ice cream mix is beaten or whipped while held in a closed container by releasing pressure which holds a suitable charge of a partially, at least, water-soluble gas in solution in the ice cream mix. The pressure of gas is so adjusted to the amount of butter fat present in the cream, and to the amount of other solid particles present that the desired type of ice cream may be invariably produced every time ice cream is made in accordance with this process. As will be hereinafter apparent, the desired volumetric expansion for "over-run" of the gas-expanded cream mix is always obtained so that the measured volume of ice cream, as well as the weight thereof, may be readily pre-determined.

Other features and advantages will appear hereinafter.

The accompanying drawing shows diagrammatically in vertical cross section apparatus suitable for making ice cream in accordance with the present invention.

In carrying out the present invention the first step is to produce any suitable standardized ice cream mix. The present invention is not particularly concerned with the specific composition of the mix, as this will in practice vary to some considerable extent. However, the invention is applicable to all mixes now being used in commercial ice cream manufacture. By way of example and not of limitation such a mix may comprise the following:

|  | Per cent |
|---|---|
| Butter fat | 12 |
| Sugar | 14½ |
| Serum solids (condensed milk) | 12 |
| Egg yolk | 0.35 |
| Gelatine or alginate gelatine (substitute of flavor) | 0.35 |

The whole mix containing 35% by way of solids.

The invention may be practiced with the use of apparatus disclosed in the accompanying drawing, wherein:

Fig. 1 is a vertical sectional view taken through a container in which the ice cream may be produced, associated apparatus being disclosed in perspective;

Fig. 2 is a vertical sectional view taken through a spring actuated valve used in connection with the container.

A mixture, as above set forth, is introduced into a closeable container of the type indicated at 1 in the drawing. As shown this container may comprise a metallic body of any desired proportions. The open top of the body may be closed by means of a lid or cover 2 held on a seating gasket 3 by means of a clamping ring 4. The lid or cover is formed with a valve casing 5, in which is arranged a spring actuated valve 6 preferably of the type employed in connection with inflatable tire tubes. Such a valve has been set forth in the co-pending application of Allyne H. Smith, Serial No. 93,665, filed July 31, 1936. Such a valve is employed since it is comparatively inexpensive to manufacture and obtain and for the further reason that it is most effective in retaining relatively high pressures within the container without leakage or appreciable diminution in pressure for prolonged periods of time.

The mix is placed within the container so that it will occupy but a portion of the total internal volumetric space of the container. For instance, the container may be about half filled with the liquid ice cream mix, although this is subject to considerable variation, depending upon the amount of "over-run" or final expansion desired.

Following the filling of the container to the desired level with the ice cream mix, the container is then closed by tightly clamping the lid or cover on the container so that gas ingress or egress into or from the container can be effected only through the valve 6. A partially, at least, water-soluble gas is then introduced into the container through the valve. As a suitable gas for this purpose, nitrous oxide alone, or in combination with other gases, such as carbon dioxide, may be used. The pressure employed in introducing the gas into the container is, of course, variable. However, with the aid of a suitable gauge 7, arranged in a pipe line 8, leading from the gas supply tank 9 to the valve 6, control of the inflow of the gas may be observed and regulated so that the internal pressure of the container may be raised from 35 to 45 pounds to the square inch preferably following agitation of the container and its contents. Agitation may be accomplished by shaking the container by hand or otherwise; ordinary handling of the container usually effects the required agitation. As nitrous oxide readily dissolves in the cream mix, the pressure of the gas when first entering the container may be considerably above 35 to 45 pounds. However, after agitation and the dissolving of the gas in the mix the pressure falls, and I generally endeavor to regulate this final pressure so that it will be within the range of 35 to 45 pounds. It will be understood, however, that this pressure is not critical and is subject to considerable variation.

When this gas-charging operation has been completed, the container is disconnected from the gas line 8 and may then be placed in a refrigerated space for storage purposes. This space, contrary to prior procedure, does not necessitate particularly low temperatures. I preferably employ a temperature of the order of 29° F. in which to store the gas-charged containers. At this temperature I found that the cream mix, charged with nitrous oxide can be preserved in a state of freshness without deterioration or multiplication of bacterial content for prolonged periods of time. At a temperature of the order of 29° F. the cream mix does not freeze, but maintains its liquid state, since the freezing point is lower by virtue of the gas dissolved in the liquid at pressures and temperatures used.

When the cream is sold to a retail dealer, for instance, the gas-charged container is placed in the refrigerating equipment which most ice cream dealers now employ. At that time the valve 6 is opened by depressing its exteriorly accessible actuating stem 10. This results in bleeding the excess gas from the interior of the container, and this release of gas is continued until the liquid mix appears visibly in the outlet of the valve. At this time the operator is informed that owing to the release of gas and the consequent expansion of the liquid mix in the container, the latter is filled to its full volumetric capacity with the expanded cream mix. The valve is then closed and the container is left in the refrigerating equipment under low temperatures for a sufficient period of time to freeze or solidify the mix.

Of course, as an alternative method of procedure, the ice cream may be frozen, if desired, in a manufacturing establishment, where the ice cream is made, rather than in the freezing equipment of the retail dealer or dispenser of ice cream. Thus, immediately after the container has been charged to the desired pressure with the expanding gas and chilled to the desired temperature, the said pressure may be released, allowing the mix in the can or container to expand as above described, and when the desired expansion has taken place, the container may be placed in a cold room and frozen, so that when delivered to the trade it will be in a frozen state. In the first method of procedure, it will be noted that it will not be incumbent upon the manufacturer to utilize expensive refrigerating equipment, thus the ice cream may be produced at a lower cost. This is particularly advantageous when it is considered that all retail dealers of ice cream now employ mechanically operated refrigerating equipment which is entirely suitable to produce requisite low temperatures to freeze and solidify the mix. It will also be apparent that, in accordance with the present invention, very little apparatus is required to produce ice cream. All that is necessary is the employment of containers of the type disclosed in one of the drawings and the gas-charging apparatus including the tank 9 and pipe line 8. This is usually supplemented by comparatively light-duty refrigerating equipment by which a temperature of the order of 29° F. may be maintained in an inclosed area for the storage of the gas-charged containers.

Various gases other than nitrous oxide may be used in carrying out this process. Nitrous oxide has been found to be preferable because of the fact that it readily dissolves in a liquid cream mixture and moreover does not in any way affect the taste of the final product. In fact, nitrous oxide possesses a somewhat sweetish taste, which is in every way pleasant, the relatively small quantities of nitrous oxide present in the final product not being in any sense injurious to human health. Other gases of course may be used in lieu of nitrous oxide or in combination therewith. For instance carbon dioxide is similarly soluble in the cream mix as is nitrous oxide. Solutions of carbon dioxide, however, have a slightly acid taste but when employed in a sweetened ice cream mixture this taste may be substantially completely disguised or unnoticed. Other gases available for the purpose are acetylene, dimethyl oxide, Freon (di-fluor-dichlormethane).

It is found that nitrous oxide, particularly, has a tendency to homogenize the mix, apparently greatly reducing the number of large fat globules, so that the usual preliminary homogenization step employed in ice cream manufacture is facilitated. In addition, nitrous oxide is an inert, neutral gas under the conditions of working and is free from any tendency to sour the cream or other ingredients. When a cream carrying a very high percentage of butter fat is used, it is preferable to whip or expand with a higher pressure of gas in the container, but the pressure is usually well below 80 pounds per square inch heretofore employed in producing whipped cream, which is not to be frozen. Another important commercial advantage of the invention is the fact that after the ice cream is frozen and is being dipped at intervals from the container, it does not tend to shrink. When the temperature of the ice cream is raised as, for instance, by exposure to room atmospheres, the gas dissolved therein tends to expand so that the shrinkage commonly met in ice cream produced by other methods of manufacture is not present in the frozen product produced by the present one. It will be apparent that the present process is one of marked simplicity, accurate control and does not necessitate the capital investment in production machinery of other commercial methods for producing ice cream.

What is claimed is:

1. The process of making ice cream comprising introducing a liquid ice cream mix into a container in such quantities that the mix will occupy but a portion of the total volumetric space of the container, charging the mix while in the container with a gas substantially soluble in said mix and with the gas under superatmospheric pressures, agitating the mix to effect intimate contact of the gas with the liquid mix to dissolve a substantial portion of the gas therein, substantially reducing the pressure of the gas within the container by releasing the same from the container whereby to transform the mix without discharge from the container into an aerated semisolid body, and subjecting said body to freezing temperatures while still retained in said container to reduce the same to a substantially frozen condition.

2. The process as defined in claim 1 wherein the charging gas comprises nitrous oxide.

3. The process as described in claim 1 wherein the pressure of the charging gas within the container following agitation of the latter is not in excess of 45 pounds per square inch.

4. The process of making ice cream comprising introducing the ingredients of an ice cream mix in a container, charging the mix with a gas soluble therein and at a pressure above atmospheric, enlarging the volume of the charged mix by bleeding off gas, and finally freezing the mix of enlarged volume after the bleeding operation is ended.

5. The process of making ice cream comprising introducing the ingredients of an ice cream mix in a container, charging the mix with a gas soluble therein and at a pressure above atmospheric to provide a liquid phase containing dissolved gas and a superimposed gaseous phase thereover, bleeding off superimposed gas to enlarge the volume of the mix, and finally freezing the mix of enlarged volume after the bleeding operation is ended.

CLARENCE M. SMITH, JR.